United States Patent
Hagimura

(10) Patent No.: US 11,853,978 B2
(45) Date of Patent: Dec. 26, 2023

(54) VIRTUAL CURRENCY MANAGEMENT METHOD

(71) Applicant: NOMURA RESEARCH INSTITUTE, LTD., Tokyo (JP)

(72) Inventor: Takuya Hagimura, Tokyo (JP)

(73) Assignee: NOMURA RESEARCH INSTITUTE, LTD., Tokyo (JP)

( * ) Notice: Subject to any disclaimer, the term of this patent is extended or adjusted under 35 U.S.C. 154(b) by 491 days.

(21) Appl. No.: 16/826,349

(22) Filed: Mar. 23, 2020

(65) Prior Publication Data

US 2020/0250656 A1    Aug. 6, 2020

Related U.S. Application Data

(63) Continuation of application No. PCT/JP2020/003631, filed on Jan. 31, 2020.

(30) Foreign Application Priority Data

Feb. 5, 2019   (JP) .................................. 2019-019198

(51) Int. Cl.
   *G06Q 20/06* (2012.01)
   *G06Q 20/36* (2012.01)
   (Continued)

(52) U.S. Cl.
   CPC ....... *G06Q 20/065* (2013.01); *G06Q 20/3676* (2013.01); *G06Q 20/407* (2013.01); *H04L 9/0637* (2013.01)

(58) Field of Classification Search
   CPC .................... G06Q 20/00–425; H04L 9/00–50
   See application file for complete search history.

(56) References Cited

U.S. PATENT DOCUMENTS

2006/0206425 A1* 9/2006 Sharma .................. G06Q 20/02
                                                                  705/40
2008/0195500 A1* 8/2008 Lutnick .................. G06Q 30/02
                                                                  705/26.43

(Continued)

FOREIGN PATENT DOCUMENTS

CN      108985773 A      12/2018
JP      11-353397 A      12/1999

(Continued)

OTHER PUBLICATIONS

"Digital Strategy, A step ahead of fintech. New generation of open innovation", MUFG Report 2017, Web page <https://www.mufg.jp/ir2017/message/digital_strategy/>, 3 pages and its English translation, total 4 pages; Cited in Specification.

(Continued)

*Primary Examiner* — Mohammad A. Nilforoush
(74) *Attorney, Agent, or Firm* — Rankin, Hill & Clark LLP

(57) ABSTRACT

Provided is a virtual currency remittance method that causes a second computer connected to a first computer including a state DB that manages account discrimination information and balance information related to virtual currency relevant to an account discriminated by the account discrimination information, and remittable account discrimination information, and a blockchain that manages transaction information including first account discrimination information, second account discrimination information, and a sum of virtual currency to be remitted from an account discriminated by the first account discrimination information to an account discriminated by the second account discrimination information.

6 Claims, 7 Drawing Sheets

(51) Int. Cl.
*H04L 9/06* (2006.01)
*G06Q 20/40* (2012.01)

(56) References Cited

U.S. PATENT DOCUMENTS

| | | | |
|---|---|---|---|
| 2017/0243209 A1* | 8/2017 | Johnsrud | H04L 12/14 |
| 2017/0330159 A1* | 11/2017 | Castinado | G06Q 20/02 |
| 2019/0050855 A1* | 2/2019 | Martino | H04L 9/0643 |
| 2020/0027080 A1* | 1/2020 | Holland | H04L 9/50 |

FOREIGN PATENT DOCUMENTS

| | | |
|---|---|---|
| JP | 2009-9420 A | 1/2009 |
| JP | 2018-72981 A | 5/2018 |
| WO | 2019/016954 A1 | 1/2019 |

OTHER PUBLICATIONS

"The grand prize of the MUFG Coin Hackathon "Fintech Challenge 2018" is "Reward Platform for Innovation"!", MUFG Innovation Hub, Mar. 15, 2018, Web page <https://innovation.mufg.jp/detail/id=247>, 4 pages and its English translation, total 6 pages; Cited in Specification.
International Search Report (ISR) dated Mar. 24, 2020 filed in PCT/JP2020/003631 and its English translation.
PCT International Preliminary Report on Patentability (Form PCT/IB/373) filed in PCT/JP2020/003631 with PCT Written Opinion of the International Searching Authority dated Mar. 24, 2020 and its English translation.
Japanese Office Action dated Jan. 31, 2023 for Japanese Patent Application No. 2019-019198; English machine translation.

\* cited by examiner

FIG. 2A  FIG. 2B  FIG. 2C  FIG. 2D

LOG-IN SCREEN 21

LOGIN

LOG-IN USING EXISTING ACCOUNT
Email address
alice@email.com
Password
••••••

LOG-IN — 211

CLICK HERE FOR NEW REGISTRATION

USE SELECTION SCREEN 22

SELECT COIN

Q SELECT COIN
ALL  THIS WEEK  THIS MONTH

[X SHOPPING MALL ONLY]
LOCAL AREA PROMOTION COIN
2018/10/1 TO 2018/10/30
ACCOUNT: abcd SCHOLARSHIP COIN
NO TIME LIMIT
ACCOUNT: bcde

BALANCE SCREEN 23

SCHOLARSHIP COIN   231
Alice Yamagata   ACCOUNT: bcde   REMITTANCE

BALANCE 1,923 COINS

2018/9/18 TO 2018/10/17
B BOOK STORE         2018/10/17
BOOK FEE             −47 COINS
A UNIVERSITY CO-OP   2018/10/01
WRITING INSTRUMENT FEE −20 COINS
DRINK FEE            −10 COINS
INCOMING COINS       2018/9/30
                     100 COINS

REMITTANCE SCREEN 24

SCHOLARSHIP COIN
Alice Yamagata   ACCOUNT: bcde

PAYEE
A ××× SHOP
B BOOK STORE
C RESTAURANT     — 241
D ELECTRIC POWER
E ×××

AMOUNT  20 COINS — 242

REMITTANCE — 243

FIG. 3A

ACCOUNT BALANCE TABLE 31

CHANNEL:
LOCAL AREA PROMOTION
(X SHOPPING MALL)

| ACCOUNT ID | BALANCE |
|---|---|
| abcd | 677 |
| cdef | 389 |
| yxwv | 345,678 |

CHANNEL:
SCHOLARSHIP

| ACCOUNT ID | BALANCE |
|---|---|
| bcde | 1,923 |
| defg | 283 |
| fghi | 4,649 |
| vuts | 123,456 |
| wvut | 234,567 |
| zyxw | 345,678 |

CHANNEL:
LOCAL AREA PROMOTION
(Y SHOPPING MALL)

| ACCOUNT ID | BALANCE |
|---|---|
| efgh | 1,923 |
| xwvu | 234,567 |

FIG. 3B

REMITTABLE ACCOUNT TABLE 32

CHANNEL:
LOCAL AREA PROMOTION
(X SHOPPING MALL)

| ACCOUNT ID | CONDITIONS |
|---|---|
| yxwv | 2018/10/1 <= REMITTANCE DATE <= 2018/10/30 |

CHANNEL:
SCHOLARSHIP

| ACCOUNT ID | CONDITIONS |
|---|---|
| vuts | NONE |
| wvut | NONE |
| zyxw | NONE |

CHANNEL:
LOCAL AREA PROMOTION
(Y SHOPPING MALL)

| ACCOUNT ID | CONDITIONS |
|---|---|
| xwvu | TERMINAL POSITION in y1 TOWN, y2 TOWN, y3 TOWN, n CITY, m PREFECTURE |

FIG. 4A

AUTHENTICATION TABLE 41

| USER ID | PASSWORD |
|---|---|
| alice@email.com | pass1 |
| bob@email.jp | pass2 |
| cecil@email.us | pass3 |
| admin@a_univ.gr.jp | pass4 |
| admin@b_books.com | pass5 |
| admin@c_dining.com | pass6 |

FIG. 4B

USER TABLE 42

| USER ID | CLIENT ID |
|---|---|
| alice@email.com | 0001 |
| bob@email.jp | 0002 |
| cecil@email.us | 0003 |
| admin@a_univ.gr.jp | 9001 |
| admin@b_books.com | 9002 |
| admin@c_dining.com | 9003 |

FIG. 4C

CLIENT TABLE 43

| CLIENT ID | USES | ACCOUNT ID |
|---|---|---|
| 0001 | LOCAL AREA PROMOTION (X SHOPPING MALL) | abcd |
| 0001 | SCHOLARSHIP | bcde |
| 0002 | LOCAL AREA PROMOTION (X SHOPPING MALL) | cdef |
| 0002 | SCHOLARSHIP | defg |
| 0002 | LOCAL AREA PROMOTION (Y SHOPPING MALL) | efgh |
| 0003 | SCHOLARSHIP | fghi |
| 9001 | SCHOLARSHIP | vuts |
| 9002 | SCHOLARSHIP | wvut |
| 9002 | LOCAL AREA PROMOTION (Y SHOPPING MALL) | xwvu |
| 9002 | LOCAL AREA PROMOTION (X SHOPPING MALL) | yxwv |
| 9003 | SCHOLARSHIP | zyxw |

*FIG. 5*

| FINANCIAL INSTITUTION ACCOUNT ID | USER ID |
|---|---|
| 123-456789 | alice@email.com |
| 234-567890 | bob@email.jp |
| 345-678901 | cecil@email.us |
| 456-789012 | admin@a_univ.gr.jp |
| 567-890123 | admin@b_books.com |
| 678-901234 | admin@c_dining.com |

VIRTUAL CURRENCY MANAGEMENT METHOD

BACKGROUND OF THE INVENTION

1. Field of the Invention

The present invention relates to a technology to manage virtual currency, and relates particularly to a technology that limits the range of remittees of virtual currency managed by a blockchain.

2. Description of the Related Art

These days, virtual currencies managed by blockchains are proposed (Non-Patent Literature 1). Specific services using virtual currency with which effects such as cost reduction and high convenience can be expected are examined through hackathons, verification tests, etc. (Non-Patent Literature 2).

Various specific services are proposed; for example, Non-Patent Literature 2 proposes a mechanism in which, when an attainer of a challenge appears from among athletes and the attainment is admitted by cloud voting, a smart contract goes into action and coins are paid to the person in question, with the concept that the feeling of a person who wants to support a player who receives a small bonus from the competition organization, such as an athlete of a minor competition, is put on a blockchain.

CITATION LIST

Patent Literature

Non-Patent Literature 1: MUFG Report 2017, Keiei-jin kara no Messeji, "Dejitaru Sutorateji" (Message from the Management, "Digital Strategy"), https://www.mufg.jp/ir2017/message/digital strategy/

Non-Patent Literature 2: MUFG INNOVATION HUB, "MUFG Coin Hackathon, "Fintech Challenge 2018" no Taisho wa 'Inobeshon no tame no Hoshokin Purattofomu'!" ("MUFG Coin Hackathon, Top Prize of "Fintech Challenge 2018" is 'Bonus Platform for Innovation'!"), https://innovation.mufg.jp/detail/id=247

As a specific service using virtual currency, one that limits the range of remittees or uses of virtual currency may be given. For example, when it is envisaged that a scholarship to a student is provided by means of a virtual currency, it is desirable that the range of shops where the virtual currency can be used be limited in order for the student not to waste the provided scholarship. Alternatively, as another example, in the case where a virtual currency is issued for a local area promotion, an article campaign, or the like, it is required that the issued virtual currency be one that is usable on a region-specific basis or on a time-limited basis.

SUMMARY OF THE INVENTION

The present invention has been made in view of such an issue, and an object of the present invention is to limit the range of remittees of virtual currency managed by a blockchain.

In order to achieve the exemplary object, the present invention according to claim 1 is a virtual currency remittance method that causes a second computer connected to a first computer including a DB that stores an account balance table that manages account discrimination information and balance information of virtual currency relevant to an account discriminated by the account discrimination information and a remittable account table that manages remittable account discrimination information, and a blockchain that stores transaction information including first account discrimination information, second account discrimination information, and a sum of virtual currency to be remitted from an account discriminated by the first account discrimination information to an account discriminated by the second account discrimination information to execute: a first step of acquiring account discrimination information of a user; a second step of acquiring remittee account discrimination information and a sum of remittance of virtual currency inputted on a terminal of the user; and a third step of transmitting, to the first computer, a command of executing a transaction in which the account discrimination information of the user is taken as the first account discrimination information, the remittee account discrimination information is taken as the second account discrimination information, and the sum of remittance of virtual currency is taken as a sum of virtual currency to be remitted from an account discriminated by the first account discrimination information to an account discriminated by the second account discrimination information, in which the command is executed by the first computer in a case where the sum of remittance of virtual currency is less than or equal to a balance relevant to the balance information discriminated by the first account discrimination information and the second account discrimination information coincides with the remittable account discrimination information.

The present invention according to claim 2 is the invention according to claim 1, in which the DB and the blockchain are managed for each piece of use information, in the first step, use designation information is further acquired, in the third step, the use designation information is further transmitted to the first computer, and the command is executed by the first computer including the DB and the blockchain relevant to the use information coinciding with the use designation information, and is executed by the first computer in a case where the sum of remittance of virtual currency is less than or equal to a balance relevant to the balance information discriminated by the first account discrimination information stored in the DB and the second account discrimination information coincides with the remittable account discrimination information stored in the DB.

The present invention according to claim 3 is the invention according to claim 2, in which the remittable account table further manages condition information, in the second step, context information of the terminal of the user is further acquired, in the third step, the context information is further transmitted to the first computer, and the command is executed in a case where the context information further satisfies a condition relevant to the condition information corresponding to the remittable account discrimination information.

The present invention according to claim 4 is the invention that causes a second computer connected to a first computer including a first DB that stores an account balance table that manages account discrimination information and balance information of virtual currency relevant to an account discriminated by the account discrimination information, and a blockchain that stores transaction information including first account discrimination information, second account discrimination information, and a sum of virtual currency to be remitted from an account discriminated by the first account discrimination information to an account discriminated by the second account discrimination information, the second computer including a second DB that stores a remittable account table that manages remittable account discrimination information, to execute: a first step of acquiring account discrimination information of a user; a second step of acquiring remittee account discrimination information and a sum of remittance of virtual currency inputted on a terminal of the user; and a third step of transmitting, to the first computer, a command of executing a transaction in which the account discrimination information of the user is taken as the first account discrimination information, the remittee account discrimination information is taken as the second account discrimination information, and the sum of remittance of virtual currency is taken as a sum of virtual currency to be remitted from an account discriminated by the first account discrimination information to an account discriminated by the second account discrimination information, in which the third step is executed in a case where the remittee account discrimination information coincides with the remittable account discrimination information, and the command is executed by the first computer in a case where the sum of remittance of virtual currency is less than or equal to a balance relevant to the balance information discriminated by the first account discrimination information.

The present invention according to claim 5 is the invention according to claim 4, in which the first DB and the blockchain are managed for each piece of use information, the remittable account table further manages the use information, in the first step, use designation information is further acquired, in the third step, the use designation information is further transmitted to the first computer, the third step is executed in a case where a record in which the use designation information coincides with the use information and furthermore the remittee account discrimination information coincides with the remittable account discrimination information is present in the remittable account table, and the command is executed by the first computer including the DB and the blockchain relevant to the use information coinciding with the use designation information, and is executed by the first computer in a case where the sum of remittance of virtual currency is less than or equal to a balance relevant to the balance information discriminated by the first account discrimination information stored in the state DB.

The present invention according to claim 6 is the invention according to claim 5, in which the remittable account table further manages condition information, in the second step, context information of the terminal of the user is further acquired, and the third step is executed in a case where the context information further satisfies a condition relevant to the condition information corresponding to the record.

In one embodiment, the account discrimination information of the user is acquired on a basis of user discrimination information inputted on the terminal of the user.

In one embodiment, the user discrimination information and account discrimination information managed by an account management system of a financial institution are associated together by the account management system.

In one embodiment, user discrimination information relevant to a nominee or a manager of an account discriminated by the remittable account discrimination information and account discrimination information managed by an account management system of a financial institution are associated together by the account management system.

BRIEF DESCRIPTION OF THE DRAWINGS

FIGS. 2A, 2B, 2C, and 2D are diagrams showing overviews of screen examples of a user terminal 1 included in a system including a virtual currency management method according to an embodiment of the present invention.

FIGS. 3A and 3B are diagrams showing table configuration examples of a state DB 7 included in a system including a virtual currency management method according to an embodiment of the present invention.

FIGS. 4A, 4B, and 4C are diagrams showing table configuration examples of a user management DB 11 included in a system including a virtual currency management method according to an embodiment of the present invention.

FIG. 5 is a diagram showing a table configuration example of an account DB 14 managed by an account management system included in a system including a virtual currency management method according to an embodiment of the present invention.

DETAILED DESCRIPTION OF THE INVENTION

The invention will now be described by reference to the preferred embodiments. This does not intend to limit the scope of the present invention, but to exemplify the invention.

Hereinbelow, embodiments of the present invention are described in detail with reference to the drawings. In all the drawings describing the embodiment, identical components are given identical reference signs, and duplicated descriptions thereof will be omitted. Additionally, in each drawing, some of the members that are not important for the description are omitted. The present invention can be implemented in many different forms, and it goes without saying that the present invention is not limited to the description disclosed below but can be variously altered without departing from the spirit of the present invention.

The virtual currency remittance method of the present invention described below is realized by the process, means and function executed in a computer based on the commands of a program (software). The program sends commands to respective components of the computer so as to make each component execute a specific process and function according to the present invention described below. That is, each of the processes, means, and functions in the present invention is realized by a specific means in which a program and a computer cooperate. Whole or a part of the program is provided by, for example, a magnetic disk, an optical disk, a semiconductor memory, or any other computer-readable recording medium, and the program read from the recording medium is installed in a computer and executed. The program can be directly loaded on the computer through a communication line with no recording medium so that the program can be executed. Further, the virtual currency remittance method according to the present invention may be implemented with a single information processing device (for example, one personal computer or the like), or may be implemented with a plurality of information processing devices (for example, a group of a plurality of server computers or the like). Note that the following embodiments are described in detail in order to describe the present invention in an easy-to-understand manner; the present invention is not necessarily limited to embodiments including all the described configurations, and additions, deletions, or substitutions of other configurations may be made to parts of the configurations of the embodiments.

Figure 1:
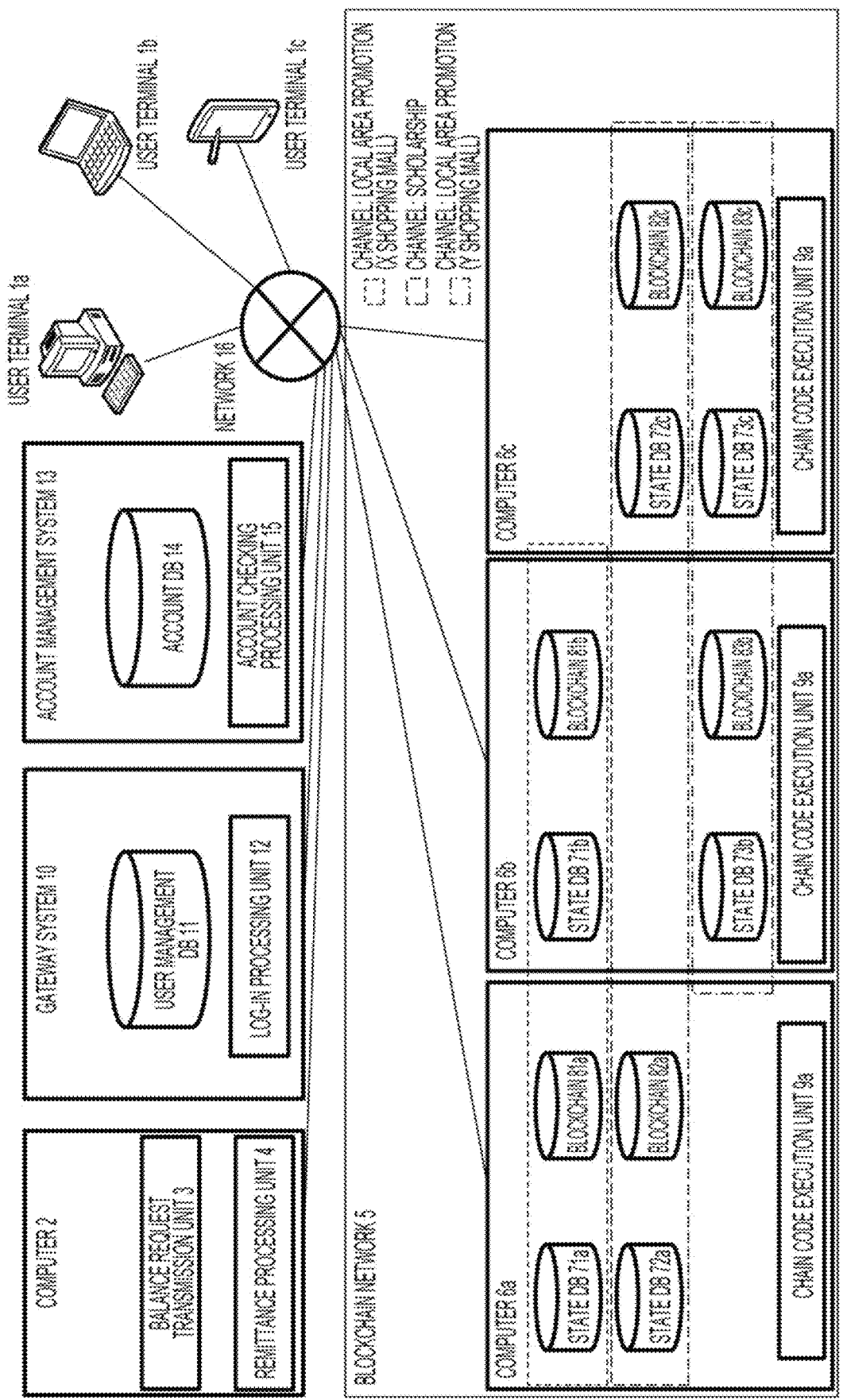
FIG. 1 is a diagram showing an overview of a configuration example of a system including a virtual currency management method that is an embodiment of the present invention.

FIG. 1 shows a system configuration that executes a virtual currency remittance method according to an embodiment of the present invention.

The system shown in the drawing that executes a virtual currency remittance method according to an embodiment of the present invention is configured as a system including one or two or more user terminals 1 (1A, 1B, 1C, . . . , and 1N; hereinafter, simply referred to as a user terminal 1) each including a virtual currency management application (not illustrated), a computer 2, two or more computers 6 (6A, 6B, 6C, . . . , and 6N; hereinafter, simply referred to as a computer 6) included in a blockchain network 5, a gateway system 10, and an account management system 13 managed by a financial institution. These are connected to be capable of making mutual data communication via, for example, a prescribed network 16 such as the Internet.

In the case where log-in processing is performed by the computer 2 or the account management system 13, the gateway system 10 may be omitted. In the case where financial institution account checking processing is not performed, the account management system 13 may be omitted.

The user terminal 1 is a terminal operated by a user who remits virtual currency, and is, for example, a personal computer, a special-purpose terminal device, a portable terminal, a smartphone, a wearable terminal, or the like; and includes an output device (for example, a display or the like) and an input device (for example, a keyboard, a mouse, or the like). The user terminal 1 is connected to the computer 2, the gateway system 10, and the account management system 13 so as to be capable of making data communication, and a not-illustrated virtual currency management application is installed in the user terminal 1. By each user operating the user terminal 1, a function provided by the system according to the present invention can be executed via the not-illustrated virtual currency management application. The virtual currency application may be executed by the user terminal 1, or may be executed by the computer 2 or the gateway system 10 by causing the user terminal 1 to function as a mere viewer (browser).

The computer 2 includes a balance request transmission unit 3 and a remittance processing unit 4, and may be composed of, for example, one or two or more server computers, or an information processing apparatus such as a server system composed of one or two or more virtual servers configured on a cloud computing service.

The computer 6 is a computer included in the blockchain network 5. In the present embodiment, it is assumed that HyperLedger (registered trademark) Fabric is used as a platform and the range of uses of virtual currency is limited. A channel that is a virtual network built in the blockchain network is provided for each use, and the computer 6 includes, for each channel, a state DB 7N (N=1, 2, . . . , and n; hereinafter, simply referred to as a state DB 7) and a blockchain 8N (N=1, 2, . . . , and n; hereinafter, simply referred to as a blockchain 8). The state DB may be mounted using LevelDB, which is a library of a key-value data store, which Google LLC has opened to the public as an open source, so that the processing speed is increased, or may be mounted using CoachDB, which is a NoSQL database of Apache, so that data are saved as documents with free data structures. The computer 6 further includes a chain code execution unit 9. In the case where channel function is not used, Ethereum, which includes account states and a blockchain, may be used as the blockchain platform, or another blockchain platform that includes a DB that manages content similar to that of the state DB and a blockchain may be used. Further, the computer 2 or the gateway system 10 may include a DB that manages content similar to that of the state DB 7; in this case, a blockchain platform not including a state DB may be employed. A blockchain platform not including a state DB may be employed also in the case where the balance corresponding to an account ID managed by an account balance table 31 described later is calculated from a transaction history on the blockchain.

The gateway system 10 includes a user management DB 11 and a log-in processing unit 12. The user management DB 11 and the log-in processing unit 12 may be included in the computer 2 or the account management system 13.

The account management system 13 is a system managed by a financial institution, and includes an account DB 14 and an account checking processing unit 15.

The network 16 includes a wired network or a wireless network, or a combination of them, and may include the Internet, an intranet, a LAN, a WAN, Wi-Fi, Bluetooth (registered trademark), a wireless telephone network, etc.

Next, a specific configuration and processing of a system formed of a configuration like the above and including a virtual currency management method according to the present embodiment are described with reference to FIG. 2 to FIG. 7.

FIG. 2 is a diagram showing an example of a screen displayed on the user terminal 1 included in a system including a virtual currency management method in the present embodiment.

The operation shown below is performed by a virtual currency application being executed by the user terminal 1.

First, a user operates the user terminal 1 to start up a virtual currency application (not illustrated). On a log-in screen 21 (FIG. 2A) displayed after the startup, the user inputs, for example, a user ID and a password assigned to the user's self, and pushes a "log-in" button 211; thereby, a log-in request is transmitted to the gateway system 10. The user ID and the password included in the log-in request are authenticated by the gateway system 10; when the presence of financial institution accounts corresponding to the user ID is found by the account management system 13, account IDs for managing virtual currency are transmitted from the gateway system 10 to the user terminal 1, and the user can log in to the virtual currency application. An account ID has been allocated to the user for each use of virtual currency. In the case where the user manages virtual currency of a plurality of uses by means of the virtual currency application, a plurality of account IDs are transmitted to the user terminal 1. The account ID may not be transmitted from the gateway system 10 to the user terminal 1 on the occasion of each log-in request, but may be set in advance in the virtual currency application installed in the user terminal 1. Further, the user ID and the password may be set in advance in the virtual currency application installed in the user terminal 1, and the virtual management application may authenticate the user ID and the password without transmitting a log-in request to the gateway system 10. Further, the user may be permitted a log-in without the checking of the presence of a financial institution account.

On the user terminal 1 that has logged in to the virtual currency application, a use selection screen 22 (FIG. 2B) is displayed, for example. On the use selection screen 22, the user selects the use of virtual currency. The range of uses of virtual currency may not be limited; in this case, the use selection screen 22 is not displayed, and a balance screen 23 (FIG. 2C) on which the virtual currency balance of an account tied to an account ID of the user uniquely determined, etc. are displayed is displayed.

When a use is selected on the use selection screen 22, the selected use and the account ID of the user uniquely determined by the selected use are transmitted to the computer 2. The computer 2 requests, of the computer 6 belonging to the channel corresponding to the received use, the virtual currency balance specified by the account ID of the user. In the case where channel function is not used, the computer 2 requests, of any computer 6, the virtual currency balance specified by the account ID of the user. On receiving the balance from the computer 6, the computer 2 transmits the balance to the user terminal 1. The user terminal 1 displays the received balance on a balance screen 23. In the case where the range of uses of virtual currency is not limited, the balance of virtual currency specified by an account ID of the user uniquely determined is displayed on the balance screen 23.

On the balance screen 23, a virtual currency use history in a prescribed period (in FIG. 2C, 2018 Sep. 18 to 2018 Oct. 17) is displayed along with the balance of virtual currency relevant to the selected use. As the virtual currency use history, shops where virtual currency was used, articles purchased using virtual currency, and the sums of virtual currency used are displayed. By the user pushing a "remittance" button 231, a remittance screen 24 (FIG. 2D) is displayed.

On the remittance screen 24, the user can select a payee from a "payee" region 241, and can, in a "quantity" region 242, designate the sum (amount) of virtual currency to be remitted. In the case where the range of uses of virtual currency is limited, the range of payees that can be selected from the "payee" region 241 varies with the use. By the user pushing a "remittance" button 243, a remittance request is transmitted from the user terminal 1 to the computer 2. The selection of a payee may be performed with a QR code as the designation of a remittee, similarly to generally performed procedures.

FIG. 3 is a diagram showing a table configuration example of the state DB 7 included in a system including a virtual currency management method according to an embodiment of the present invention.

In the state DB 7, an account balance table 31 (FIG. 3A) and a remittable account table 32 (FIG. 3B) are managed for each channel (for each use). In the case of virtual currency of which the range of uses is not limited, the content of the state DB 7 is common to all the computers 6.

The account balance table 31 manages, for each account, an "account ID" for discriminating the account and a "balance" of virtual currency.

Although not illustrated, channel function may not be used; in this case, the account balance table 31 manages, for each account, an "account ID" for discriminating the account, and a "use" and a "balance" of virtual currency. In the case where a state DB is mounted using LevelDB, an "account ID" is taken as Key, and a set of a "use" and a "balance" is as Value.

The remittable account table 32 manages, for each virtual currency account that can be a remittee of virtual currency (hereinafter, referred to as a "remittable account"), an "account ID" for discriminating the remittable account and "conditions" for the execution of a transaction for remittance processing by the chain code execution unit 9. In the "conditions", for example, a geographical range that the position information of the user terminal 1 should satisfy, a temporal range that the remittance processing day should satisfy, etc. are managed. In the "payee" region 241 on the remittance screen 24 of the virtual currency application, it is possible to display all the remittable accounts tied to the account IDs that are managed on the basis of the channel corresponding to a use selected on the use selection screen 22 of the virtual currency application and that are stored in the remittable account table 32, or to display only the remittable accounts tied to the account IDs corresponding to conditions that the position information of the user terminal 1 or the remittance processing day satisfies. In general, the specification of a remittee of virtual currency on a blockchain is performed by reading a QR code showing an account ID; a technical factor of this is that only a table equivalent to the account balance table 31 of the present invention is managed on the blockchain, thus there are an infinite number of account IDs stored in the table, and hence it is difficult to display candidates for remittees on an interface like the "payee" region 241 of the present invention. In the present invention, since the remittable account table 32 is provided separately from the account balance table 31, a prescribed number of account IDs can be displayed as candidates for payees in the "payee" region 241, in a form in which the number of account IDs is limited to a prescribed number. Further, by limiting the range of uses by channel function and managing the content of the remittable account table 32 for each use, the number of candidates for remittees displayed in the "payee" region 241 can be limited by searching the remittable account table 32; thus, the speed of display processing can be increased.

Although not illustrated, channel function may not be used; in this case, the remittable account table 32 manages, for each remittable account, an "account ID" for discriminating the remittable account, and a "use" and "conditions" of virtual currency. In the case where a state DB is mounted using LevelDB, an "account ID" is taken as Key, and a set of a "use" and "conditions" is as Value.

FIG. 4 is a diagram showing a table configuration example of the user management DB 11 included in a system including a virtual currency management method according to an embodiment of the present invention.

In the user management DB 11, an authentication table 41 (FIG. 4A), a user table 42 (FIG. 4B), and a client table 43 (FIG. 4C) are managed.

The authentication table 41 manages, for each user who uses the system including a virtual currency management method according to an embodiment of the present invention, a "user ID" and a "password" for discriminating the user, such as an e-mail address. In the case where, for example, not the gateway system 10 but the account management system 13 performs authentication processing by using an authentication protocol such as OpenID or SAML, the authentication table 41 may be omitted.

The user table 42 manages, for each user who uses the system including a virtual currency management method according to an embodiment of the present invention, a "user ID" for the discrimination of the user by the account management system 13, such as an e-mail address, and a "client ID" for discriminating the user in the system including a virtual currency management method according to an embodiment of the present invention.

The client table 43 manages "client IDs", "uses", and "account IDs". The "account ID" is uniquely determined by the "client ID" and the "use".

The user table 42 may be omitted, and the client table 43 may manage the "user ID", the "account ID", and the "use".

In the authentication table 41, the user table 42, and the client table 43, not only a user who remits virtual currency by operating the user terminal 1 but also a nominee or a manager of a virtual currency account, such as a shop or an enterprise that receives virtual currency as a consideration to an article or a service, may be managed.

FIG. 5 is a diagram showing a table configuration example of the account DB 14 managed by an account management system included in a system including a virtual currency management method according to an embodiment of the present invention.

The table of the account DB 14 manages, for each user who has opened an account in a financial institution, a "financial institution account ID" and a "user ID". In the case where, for example, not the gateway system 9 but the account management system 13 performs authentication processing by using an authentication protocol such as OpenID or SAML, the table of the account DB 14 may further manage "passwords".

Figure 6:
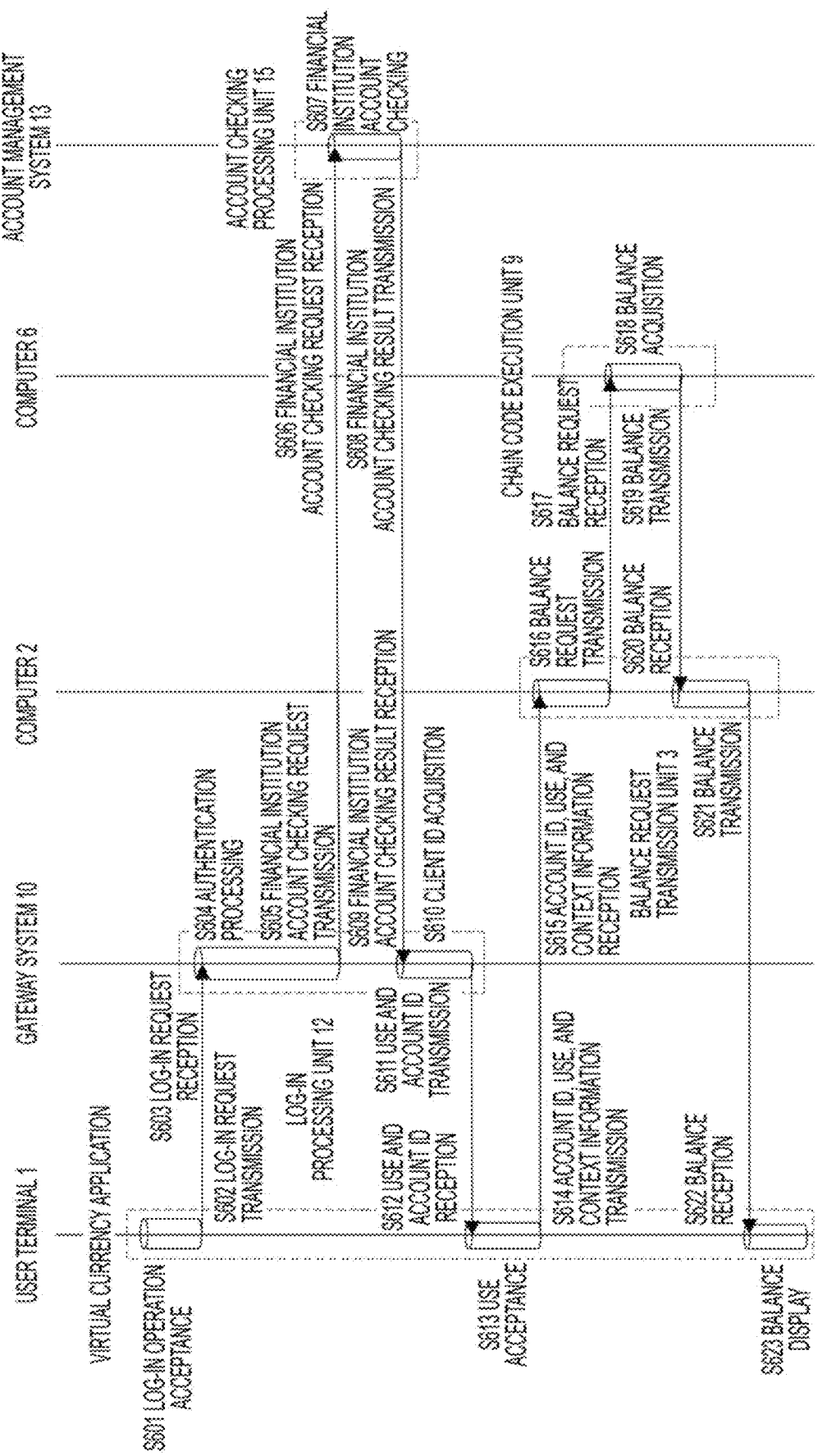
FIG. 6 is a diagram showing a processing sequence from the acceptance of a log-in operation to the display of a balance of a system including a virtual currency management method according to an embodiment of the present invention.

FIG. 6 is a diagram showing a processing sequence from the acceptance of a log-in operation to the display of a balance of a system including a virtual currency management method according to an embodiment of the present invention.

First, when a user starts up a virtual currency application on the user terminal 1, the log-in screen 21 for inputting a user ID and a password is displayed on the user terminal 1 (S601: log-in operation acceptance). In the case where, for example, not the gateway system 10 but the account management system 13 performs authentication processing by using an authentication protocol such as OpenID, the user may be caused to input, on the log-in screen 21, information that authentication is to be received from the account management system 13, in addition to the user ID and the password. In the case where the account management system 13 performs authentication processing by using an authentication protocol such as SAML, a screen on which the user inputs information of giving consent to receiving authentication from the account management system 13 may be first displayed in place of the log-in screen 21, after that the gateway system 10 that has received the information inputted by the user of giving consent to receiving authentication from the account management system 13 may redirect a session to the account management system 13, and the account management system 13 may display the log-in screen 21.

When the user inputs the user ID and the password and pushes the log-in button 211, a log-in request including the user ID and the password is transmitted to the gateway system 10 (S602: log-in request transmission). In the case where, for example, not the gateway system 10 but the account management system 13 performs authentication processing by using an authentication protocol such as OpenID or SAML, a log-in request is transmitted not to the gateway system 10 but to the account management system 13.

When the gateway system 10 receives the log-in request (S603: log-in request reception), it is checked whether the set of the user ID and the password included in the log-in request is included in a record managed by the authentication table 41 or not (S604: authentication processing). In the case where, for example, not the gateway system 10 but the account management system 13 performs authentication processing by using an authentication protocol such as OpenID or SAML, the account management system 13 checks whether the set of the user ID and the password included in the log-in request is included in a record managed by the table of the account DB 14 or not.

When it is checked that the set of the user ID and the password is included in the record managed by the authentication table 41, the gateway system 10 transmits a financial institution account checking request including the user ID to the account management system 13 (S605: financial institution account checking request transmission), and the account management system 13 receives the financial institution account checking request (S606: financial institution account checking request reception). In the case where, for example, not the gateway system 10 but the account management system 13 performs authentication processing by using an authentication protocol such as OpenID or SAML, the processing of S605 and S606 may be omitted.

On receiving the financial institution account checking request (S606: financial institution account checking request reception), the account management system 13 checks whether the user ID included in the financial institution account checking request coincides with any of the user IDs of the record managed by the table of the account DB 14 or not (S607: financial institution account checking processing).

When the account management system 13 checks whether the user ID included in the financial institution account checking request coincides with any of the user IDs of the record managed by the table of the account DB 14 or not, the account management system 13 transmits the result (S608: financial institution account checking result transmission), and the gateway system 10 receives the result (S609: financial institution account checking result reception).

The checking of the presence of the financial institution account is a process for performing customer checking (Know Your Customer (KYC)), which is effective to prevent money laundering or the like. In the case where customer checking is not necessary or in the case where customer checking is, even though necessary, solved by another means, the processing of S605 to S609 may be omitted.

In the case where the received financial institution account checking result is affirmative, the gateway system 10 acquires the client ID corresponding to the user ID from the user table 42 (S610: client ID acquisition), and transmits, to the user terminal 1, sets of a use and an account ID corresponding to the client ID acquired from the client table 43 (S611: use and account ID transmission). In the case where the virtual currency application manages the use and the account ID, the processing of S610 and S611 may be omitted, and it is possible to transmit to the user terminal 1 only the fact that the financial institution account checking result is affirmative. In the case where the processing of S605 to S609 is omitted, when the checking result of S604 is affirmative, the gateway system 10 acquires the client ID corresponding to the user ID from the user table 42, and transmits sets of a use and an account ID corresponding to the acquired client ID to the user terminal 1. In the case where, for example, not the gateway system 10 but the account management system 13 performs authentication processing by using an authentication protocol such as OpenID or SAML, the processing of S609 may be omitted, and the account management system 13 may manage a table that is content similar to that of the client table 43 and in which the "client ID" is replaced with the "user ID" and may perform the processing of S610 and S611.

When the user terminal 1 receives the uses and the account IDs (S612: use and account ID reception), the use selection screen 22 is displayed on the user terminal 1. Then, when the user selects a use of virtual currency on the use selection screen 22 (S613: use acceptance), the user terminal 1 transmits, to the computer 2, context information such as the position information of the user terminal 1, as well as the account ID and the selected use (S614: account ID, use, and context information transmission). In the case where the range of remittable accounts displayed in the "payee" region 241 on the remittance screen 24 of the virtual currency application is not varied with the position, etc. of the user terminal 1 or in the case where the pros and cons of the transmission of virtual currency is not controlled by the position, etc. of the user terminal 1, context information may not be transmitted. The uses of virtual currency that the user can select on the use selection screen 22 may be centrally set by a manager of the system including a virtual currency management method that is an embodiment of the present invention, or may be freely set by the user and may be shared with other users by transmitting and receiving information discriminating the uses, or the like.

When the computer 2 receives the account ID, the selected use, and the context information (S615: account ID, use, and context information reception), the computer 2 transmits the account ID and the context information to the computer 6 belonging to the channel corresponding to the received use (S616: balance request transmission). In the case where the limitation of the range of uses is not implemented by channel function, and the account balance table 31 manages the "account ID", the "use", and the "balance" and the remittable account table 32 manages the "account ID", the "use", and the "conditions", a balance request including the account ID and the use is transmitted to any of the computers 6 included in the blockchain network 5.

When the computer 6 receives the balance request (S617: balance request reception), the computer 6 acquires the balance corresponding to the account ID included in the balance request from the account balance table 31 (S618: balance acquisition), and transmits the balance to the computer 2 (S619: balance transmission). In the case where the limitation of the range of uses is not implemented by channel function, and the account balance table 31 manages the "account ID", the "use", and the "balance" and the remittable account table 32 manages the "account ID", the "use", and the "conditions", the computer 6 acquires, from the account balance table 31, the balance corresponding to the set of the account ID and the use included in the balance request (S618: balance acquisition), and transmits the balance to the computer 2 (S619: balance transmission). In the case where a blockchain platform not including a state DB is employed as the blockchain platform, the account balance table 31 is omitted, and the balance corresponding to the set of the account ID and the use included in the balance request is calculated using a transaction history managed by the blockchain 8. In the case where the computer 6 includes the account balance table 31, S616 and S617 are omitted, and the computer 6 executes S618 and S619.

On receiving the balance (S620: balance reception), the computer 2 transmits the balance to the user terminal 1 (S621: balance transmission). In the case where the computer 2 includes the account balance table 31, S616, S617, and S620 are omitted, and the computer 2 executes S618, S619, and S621.

When the user terminal 1 receives the balance (S622: balance reception), the balance screen 23 is displayed on the user terminal 1 (S623: balance display).

Figure 7:
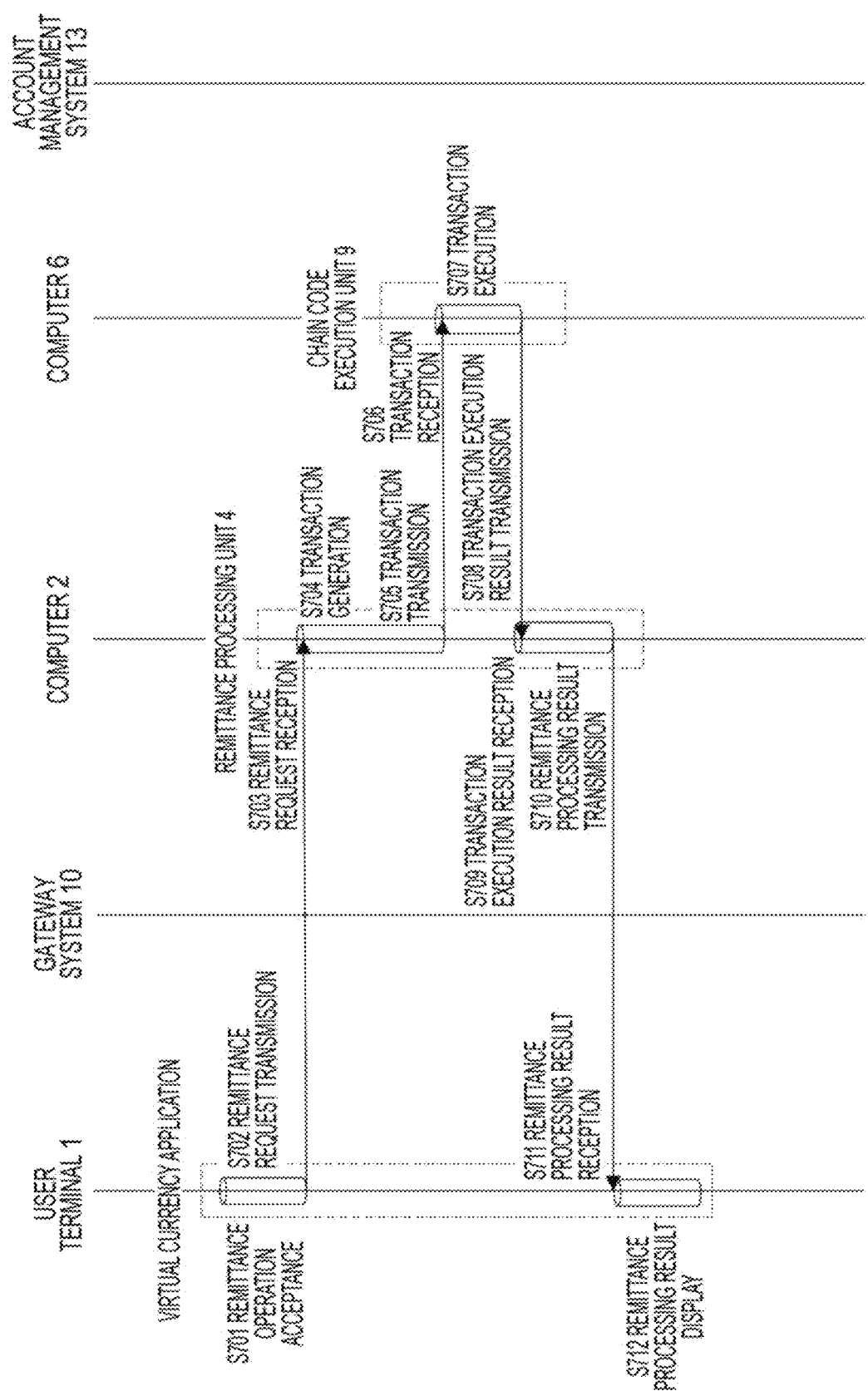
FIG. 7 is a diagram showing a processing sequence from the acceptance of a remittance operation to the reception of a remittance processing result of a system including a virtual currency management method according to an embodiment of the present invention.

FIG. 7 is a diagram showing a processing sequence from the acceptance of a remittance operation to the reception of a remittance processing result of a system including a virtual currency management method according to an embodiment of the present invention.

When the user pushes the "remittance" 231 button on the balance screen 23 displayed on the user terminal 1, the remittance screen 24 is displayed on the user terminal 1 (S701: remittance operation acceptance).

When, on the remittance screen 24 displayed on the user terminal 1, the user selects a payee from the "payee" region 241, designates the sum (amount) of virtual currency to be remitted in the "quantity" region 242, and pushes the "remittance" button 243, a remittance request including the account ID, the use, the selected payee, the designated sum (amount) of virtual currency to be remitted, the position information of the user terminal 1, etc. is transmitted from the user terminal 1 to the computer 2 (S702: remittance request transmission). In the case where the pros and cons of the transmission of virtual currency is not controlled by the position, etc. of the user terminal 1 or in the case where the context information transmitted to the computer 2 in S614 is diverted, the position information, etc. may not be included in the remittance request.

On receiving the remittance request (S703: remittance request reception), the computer 2 generates transaction data in which the account ID included in the remittance request is taken as the "remitter", the selected payee included in the remittance request is as the "remittee", the designated sum (amount) of virtual currency to be remitted included in the remittance request is as the "sum of remittance", and the position information, etc. of the user terminal 1 is as the "context information" (S704: transaction generation). In the case where the pros and cons of the transmission of virtual currency is not controlled by the position, etc. of the user terminal 1, the "context information" may not be included in the transaction data. In the case where the limitation of the range of uses is not implemented by channel function, and the account balance table 31 manages the "account ID", the "use", and the "balance" and the remittable account table 32 manages the "account ID", the "use", and the "conditions", the use included in the remittance request is included as "use designation information" in the transaction data.

The computer 2 transmits the generated transaction data to the computer 6 belonging to the channel corresponding to the use included in the remittance request (S705: transaction transmission). Specifically, the computer 2 includes an SDK of a blockchain platform such as HyperLedger Fabric, and transmits the transaction data to the computer 6 through the SDK. Which computer 6 to transmit the transaction data to is set by the SDK.

In the case where the limitation of the range of uses is not implemented by channel function, and the account balance table 31 manages the "account ID", the "use", and the "balance" and the remittable account table 32 manages the "account ID", the "use", and the "conditions", the generated transaction data are transmitted to any of the computers 6. In the case where the user terminal 1 includes an SDK of a blockchain platform such as HyperLedger Fabric and the virtual currency application transmits the transaction data to the computer 6, S702 and S703 are omitted, and the virtual currency application executes S704 and S705.

On receiving the transaction data (S706: transaction reception), the computer 6 executes the transaction by means of the chain code execution unit 9a (S707: transaction execution). Specifically, in the case where HyperLedger Fabric is used as the platform, a computer 6 that has received the transaction data checks whether the transaction can be executed and the transaction can be approved or not (simulation of the transaction). The conditions under which the transaction is approved are described later. The simulation result is not committed to the blockchain. Next, when the simulation ends without accident, the transaction is regarded as being successful, and the computer 6 returns a value set before and after updating acquired at the time of the simulation to the computer 2 through the SDK (completion of the simulation). After that, the value set before and after updating is transmitted from the computer 2 toward a computer 6 that plays the role of an Orderer (submission to the Orderer), and a commitment request is transmitted from the Orderer to other computers 6 that play the roles of Peers (transmission of the commitment request from the Orderer to each Peer). Then, each computer 6 performs the final verification in order to decide whether to permit the execution of the transaction or not (verification of the transaction). In the case where, for the values before and after updating, the value set before and after updating transmitted from the computer 2 and a value set before and after updating acquired at the time of this verification are different, the transaction is rejected. In the case where the transaction is approved as a result of the verification, the history is left in the blockchain, the value of the world state is updated, the sum of remittance of the transaction data is subtracted from the balance of virtual currency that is managed by the account balance table 31 and that is specified by the account ID set as the remitter of the transaction data, and the sum of remittance of the transaction data is added to the balance of virtual currency specified by the account ID set as the remittee of the transaction data. In the case where the transaction is rejected, the history is left in the blockchain while an invalid (failure) mark is attached, but the value of the world state and the account balance table 31 are not updated.

The conditions under which the transaction is approved are that the sum of remittance of the transaction data be less than or equal to the balance of virtual currency that is managed by the account balance table 31 and that is specified by the account ID set as the remitter of the transaction data, that the account ID set as the remittee of the transaction data coincide with an account ID managed by the remittable account table 32, and that the context information of the transaction data satisfy the conditions corresponding to the account ID managed by the remittable account table 32.

In the case where the pros and cons of the transmission of virtual currency is not controlled by the position, etc. of the user terminal 1, it is not necessary that the context information of the transaction data satisfy the conditions corresponding to the account ID managed by the remittable account table 32.

In the case where the limitation of the range of uses is not implemented by channel function, and the account balance table 31 manages the "account ID", the "use", and the "balance" and the remittable account table 32 manages the "account ID", the "use", and the "conditions", the conditions under which the transaction is approved are that the sum of remittance of the transaction data be less than or equal to the balance of virtual currency that is managed by the account balance table 31 and that corresponds to the set of the account ID set as the remitter of the transaction data and the use set as the use designation information of the transaction data, and that the context information of the transaction data satisfy the conditions that are managed by the remittable account table 32 and that correspond to the set of the account ID set as the remittee of the transaction data and the use set as the use designation information of the transaction data. In the case where the pros and cons of the transmission of virtual currency is not controlled by the position, etc. of the user terminal 1, it is not necessary that the context information of the transaction data satisfy the conditions that are managed by the remittable account table 32 and that correspond to the set of the account ID mentioned above and the use mentioned above.

On executing the transaction, the computer 6 transmits to the computer 2 the result of execution of the transaction of whether the transaction has been approved or rejected (S708: transaction execution result transmission), and the computer 2 receives the result of execution of the transaction (S709: transaction execution result reception). On receiving the result of execution of the transaction, the computer 2 transmits to the user terminal 1 the result of remittance processing of whether remittance corresponding to the transaction has been made successfully or not (S710: remittance processing result result transmission), and the user terminal 1 receives the result of remittance processing (S711: remittance processing result result reception). Then, the user terminal 1 displays the result of remittance processing on a screen (not illustrated) (S712: remittance processing result display).

In the case where the user terminal 1 includes an SDK of a blockchain platform such as HyperLedger Fabric and the virtual currency application transmits the transaction data to the computer 6, the computer 6 transmits the result of execution of the transaction to the user terminal 1 (S708': transaction execution result transmission), and the user terminal 1 receives the result of execution of the transaction (S709': transaction execution result reception). Then, S710 and S711 are omitted, and the user terminal 1 displays the result of remittance processing of whether remittance corresponding to the transaction has been made successfully or not on a screen (not illustrated) (S712': remittance processing result display).

What is claimed is:

1. A virtual currency remittance method executed in a system comprising a plurality of first computers and a second computer, the second computer connected to the plurality of first computers included in a blockchain network which includes a plurality of channels provided for each use of virtual currency, each one of the plurality of first computers belonging to at least one of the plurality of channels, each one of the first computers including a first DB and blockchain associated with each one of the plurality of channels to which it belongs, each of the first DB storing an account balance table that manages account discrimination information and balance information of virtual currency relevant to an account discriminated by the account discrimination information, each of the blockchains storing transaction information including first account discrimination information, second account discrimination information, and a sum of virtual currency to be remitted from an account discriminated by the first account discrimination information to an account discriminated by the second account discrimination information, the second computer including a second DB that stores a remittable account table in which remittable account discrimination information, the each use of virtual currency and conditions for an execution of remittance are associated with each other, the conditions including a geographical range of position information and a temporal range of a day of executing transaction, the method comprising:

a step of communicating, by the second computer, with a terminal of a user of the virtual currency over a data communication network to acquire, from the terminal of the user, account discrimination information of the user, a use of the virtual currency and context information including position information of the terminal of the user;

a step of referring, by the second computer, to the remittable account table and displaying a remittance screen on the terminal of the user, the remittance screen showing only remittable accounts tied to the remittable account discrimination information that are corresponding to the use acquired from the terminal of the user and that are corresponding to at least either one of the geographical range or the temporal range satisfied with the context information acquired from the terminal of the user as candidates for remittees;

a step of communicating, by the second computer, with the terminal of the user over the data communication network to acquire, from the terminal of the user, remittee account discrimination information discriminating a remittable account selected from the candidates on the remittance screen and a sum of remittance of virtual currency;

determining, by the second computer, one of the plurality of first computers belonging to the channel corresponding to the use acquired from the terminal of the user and including a first DB and a blockchain associated with the channel corresponding to the use acquired from the terminal of the user;

determining, by the second computer, that the remittee account discrimination information corresponds with the remittable account discrimination information and the context information acquired from the terminal of the user satisfies the condition corresponding to the remittee account discrimination information that coincides with the remittable account discrimination information; and a step of communicating, by the second computer, with the determined one of the plurality of first computers over the data communication network to transmit, to the determined one of the plurality of first computers, a command of executing a transaction in which the account discrimination information of the user is taken as the first account discrimination information, the remittee account discrimination information is taken as the second account discrimination information, and the sum of remittance of virtual currency is taken as a sum of virtual currency to be remitted from an account discriminated by the first account discrimination information to an account discriminated by the second account discrimination information, and determining, by the determined one of the plurality of first computers that the sum of remittance of virtual currency is less than or equal to a balance relevant to the balance information discriminated by the first account discrimination information that the sum of remittance of virtual currency is less than or equal to a balance relevant to the balance information discriminated by the first account discrimination information, and executing the command.

2. The virtual currency remittance method according to claim 1, wherein the account discrimination information of the user is acquired on a basis of user discrimination information inputted on the terminal of the user.

3. The virtual currency remittance method according to claim 2, wherein the user discrimination information and account discrimination information managed by an account management system of a financial institution are associated together by the account management system.

4. The virtual currency remittance method according to claim 1, wherein user discrimination information relevant to a nominee or a manager of an account discriminated by the remittable account discrimination information and account discrimination information managed by an account management system of a financial institution are associated together by the account management system.

5. The virtual currency remittance method according to claim 1, further comprising: a step of accessing, by the second computer, to the second DB to acquire remittable accounts tied to the account discrimination information of the user before the step of displaying the remittance screen on the terminal of the user.

6. The virtual currency remittance method according to claim 1, further comprising:
a step of accessing, by the second computer, one of the plurality of first computers belonging to the channel corresponding to the use acquired from the terminal of the user, and displaying a balance screen on the terminal of the user, the balance screen showing the balance information stored in the account balance table in the one of the plurality of first computers belonging to the channel corresponding to the use acquired from the terminal of the user.

* * * * *